United States Patent [19]
Rohan

[11] Patent Number: 5,797,129
[45] Date of Patent: Aug. 18, 1998

[54] PREDICTING RESOURCE USAGE IN A MULTIPLE TASK, MULTIPLE RESOURCE ENVIRONMENT

[75] Inventor: Darius Rohan, Dallas, Tex.

[73] Assignee: Texas Instruments Incorporated, Dallas, Tex.

[21] Appl. No.: 785,836

[22] Filed: Oct. 31, 1991

[51] Int. Cl.$^6$ ............................................. G06F 163/00
[52] U.S. Cl. ............................................. 705/8; 705/9
[58] Field of Search ............................ 364/401, 406, 364/408, 468, 468.13; 395/207–208, 201, 259; 705/1, 7, 8, 6, 9

[56] References Cited

U.S. PATENT DOCUMENTS

| | | |
|---|---|---|
| 3,593,008 | 7/1971 | De Witt et al. .................. 364/401 |
| 4,459,663 | 7/1984 | Dye ................................... 364/200 |
| 4,685,125 | 8/1987 | Zave .................................. 364/130 |
| 4,802,094 | 1/1989 | Nakamur et al. ................ 364/468 |
| 4,958,292 | 9/1990 | Kaneko et al. .................. 364/468 |
| 5,301,320 | 4/1994 | McAtee et al. ........................ 705/9 |
| 5,398,336 | 3/1995 | Tantry et al. ...................... 707/103 |

*Primary Examiner*—Frantzy Poinvil
*Attorney, Agent, or Firm*—Robert L. Troike; Wade James Brady, III; Richard L. Donaldson

[57] ABSTRACT

A method for calculating the use of resources in a multi-task, multi-resource environment, such as a factory that produces more than one product and that has at least one machine that can process more than one product. The resources are grouped into resource groups according to the tasks they process. The method includes solving an iterative algorithm, whose solution is a fractional value representing the effective number of resources per resource group. This value can be used in usage formulas where the number of resources per group is used to determine how tasks should be allocated.

16 Claims, 2 Drawing Sheets

PREDICTING RESOURCE USAGE IN A MULTIPLE TASK, MULTIPLE RESOURCE ENVIRONMENT

RELATED PATENT APPLICATIONS

The following patent applications are related to the present application, and are incorporated by reference herein:

U.S. Ser. No. 07/558,970, filed Jul. 26, 1990, now U.S. Pat. No. 5,280,925, "Apparatus and Method for Production Planning".

TECHNICAL FIELD OF THE INVENTION

This invention relates to production planning, and more particularly to a method for predicting the usage of scarce resources when there are multiple tasks and multiple resources that may perform the same task.

BACKGROUND OF THE INVENTION

Processes that involve tasks to be performed on various types of equipment are often analyzed in terms of the most efficient method for scheduling the use of each piece of equipment. Typically each piece of equipment, generally referred to as a "resource", has its own set of constraints defining that resource's ability to respond to demand.

An example of resource allocation involving multiple tasks and multiple resources is a system of satellites and their associated communication channels. The multiple resources are three satellites, which are positioned to transmit from the United States to, respectively, other locations in the United States, locations in Europe, and locations in both the United States and Europe. The multiple tasks are the incoming customer requests for connections to Europe and the United States. The scheduling problem involves dispatching customer requests into the alternative communication channels so as to maximize performance of the entire system.

Another example of a multiple task, multiple resource environment is a manufacturing plant in which a factory makes more than one product and each process uses one or more of three different machines.

In order to configure resources and schedule tasks for the most efficient use, various methods of production planning have been developed. One approach to production planning is computer simulation, which is expensive and time consuming. The simulation must be set up and the appropriate algorithms programmed.

Another approach involves analytical algorithms that do not involve simulations. Many such algorithms include an analysis of the pattern of usage across each resource, and methods have been developed for calculating usage factors. A usage factor for a single resource is defined as:

Usage Factor=Arrival Rate×Service Time/N, where the arrival rate and service time are in terms of the resource in question and N is the number of resources. Once a usage factor is determined, known scheduling techniques can be used to adjust them so that processing time per task is minimized.

In multi-task production planning usage factor calculations often define "machine groups", where a "machine group" includes those machines that can perform the same task. If a machine in one group can perform more than one task, it is considered a "shared machine", and it will be a member of all groups associated with the tasks it can perform. The usage factor may then be determined with respect to each machine group, such that N in the above expression represents the number of machines in the machine group.

In existing methods, a sharable machine is represented in each machine group of which it is a member. However, a problem with this method is that it overstates the availability of resources. A need exists for a method to determine a usage factor that preserves the true availability of resources.

SUMMARY OF THE INVENTION

One aspect of the invention is a method for determining usage of resources in a multi-task multi-resource environment. At least two resource groups are identified, such that the members of each resource group are those resources capable of performing a certain task. In the multi-task, multi-resource environment, it is assumed that at least one member of said resource groups is a shared resource, in that it may perform more than one task. With respect to each resource group, a group weight value that equals the total resource usage of that group divided by the number of resources in that group is calculated. With respect to each resource, a resource weight value that equals the sum of resource usage for all tasks for that resource is calculated, and the group weight value is divided by said resource weight value to obtain an allocation value for that resource. Then, with respect to each resource group, the allocation values for each resource in the group are summed, to obtain a value approximating the effective number of resources in that group. These steps are repeated, using the results of 1 the summing step instead of using the initial number of resources in each group to calculate the group weight value, until a final effective resource value approximating the effective number of resources for each group is obtained. Based on this effective number of resources per group, tasks are assigned, which may involve adjusting arrival rates, service times, or resource configurations within each group.

Variations of the algorithm include the use of different weighing functions, and the solution of the algorithm with more than one weighing function and interpolation of results. Also, a correction factor has been developed for improving the accuracy of the solution for a greater number of resource configurations.

A technical advantage of the invention is that it provides a method for predicting use of alternative resources in an environment where multiple tasks may be executed by one of more shared resources. A steady state usage factor for the resources may be accurately calculated. A relatively small amount of calculations are required, which permits the computerized algorithm to be very fast.

Using this method, procurement and configuration of resources may be planned. Tasks can be dispatched and the resources can be reconfigured according to current predicted use. In a factory environment, potential bottlenecks can be identified and changing product mixes can result in reconfiguration of machine groups.

DETAILED DESCRIPTION OF THE INVENTION

Figure 1:
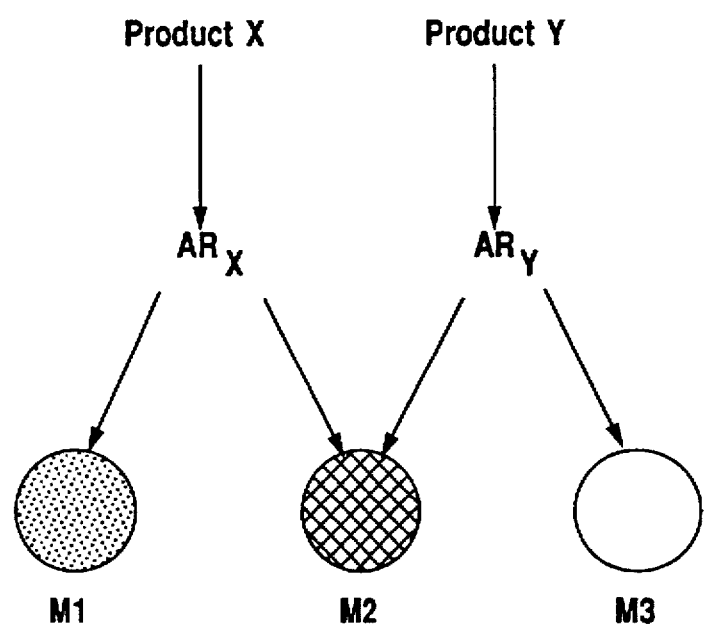
FIG. 1 illustrates a multiple-task, multiple resource environment.

FIG. 1 illustrates an multiple task, multiple resource environment. The example used herein of such an environment is a production plant having machines for processing multiple products. However, this is only one application of the invention. Other examples are switching of telephone calls into alternative communication channels, scheduling tasks among microprocessors in a multi/parallel processing environment, and job assignment in projects with a mixed/multi skilled labor pool.

There are two products, X and Y, and three resources in the form of machines. Each machine is identified with a unique numeral Mk, where k=1 ... K. Machines M1 and M2 can process product X and machines M2 and M3 can process product Y. In other words, machine M2 is "sharable", whereas machines M1 and M3 are dedicated to a single task.

Figure 2:
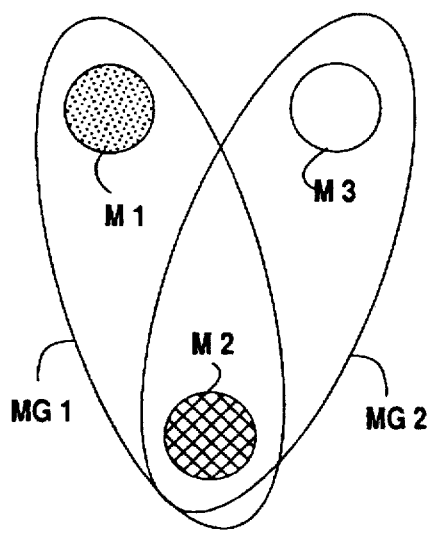
FIG. 2 illustrates the grouping of resources into resource groups, which may have shared resources.

FIG. 2 illustrates the concept of a resource group, which in the production plant example used herein, is a machine group (MG). The set of machines that can perform a certain task are members of a group. Each machine group is identified by a numeral MGj, where j=1 ... J. Thus, because machines M1 and M2 can process product X, they are members of MG1. Similarly, machines M2 and M3 are members of MG2. The notation, $MG_j$, represents the set of all machines in a machine group. A machine Mk may be shared by two or more machine groups.

Figure 3:
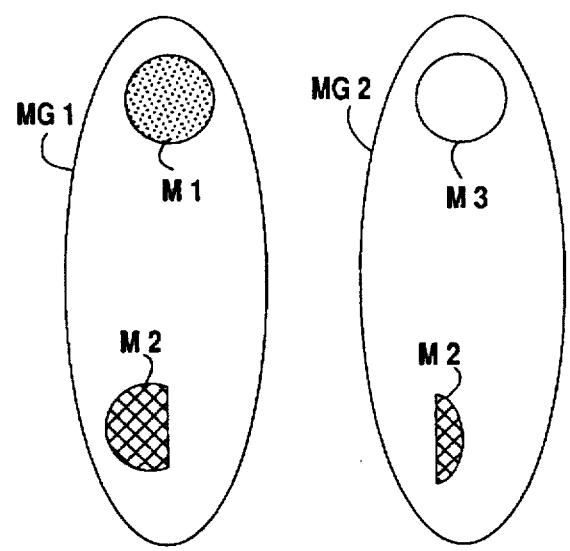
FIG. 3 illustrates two resource groups, each having an allocation of a shared machine as a member.

FIG. 3 illustrates a machine group decomposition into separate groups, each containing a fractional representation of the sharable machine, M2. A basic concept of the invention is that each sharable machine, such as M2, is represented as a fraction of a machine in each of its groups, i.e., an "allocation value". For example, a machine equally shared between two groups would be represented as ½ a machine in one group and ½ in the other. When considering the total number of effective resources in a group, the shared machine's fractional allocation value is added to the integer allocation values of non-shared machines. The fractions are derived using an iterative analytical algorithm described herein.

Referring again to FIG. 1, each machine group is associated with a mean arrival rate, $AR_j$, of jobs into the queue for that machine group, MGj. The mean service time corresponding to jobs coming into this queue is $ST_j$. The notation, $MH_j$, represents the total machine hours needed for processing at a machine group, MGj. The total machine hours may be symbolically expressed as:

$$MH_j = AR_j \times ST_j$$

Given a value representing $MH_j$, the ability to determine a usage factor for that machine group, $MH_j/N_j$, depends on the value of $N_j$. Once the usage factor is known, a decision can be made regarding how tasks should be allocated to each machines or the machines reconfigured. Techniques are known in the art of production planning whereby certain usage factor values are desired to maximize overall efficiency.

If the group has one or more shared resources, counting that machine as a member of each machine group results in inaccurate usage factors for its groups. To avoid overstating the availability of shared resources, an iterative algorithm is used to determine an "effective" number of machines, $N_j$, for any one machine group. The number of machines attributed to machine group j at an ith iteration, where i=0, 1, 2, 3 ..., is $N_{ij}$. The problem is to find a function such that:

$$N_{i+1,j} = f(N_{i1}, N_{i2}, \ldots N_{ij}, \ldots N_{iJ}),$$

with the property that $N_{ij}$ approaches $N_j$ as i approaches infinity, given that an arbitrary but suitable initial value of $N_{0j}$ is chosen.

A solution to the above algorithm may be found by first defining the following generalized weight function:

$$w_{ij} = g(MH_j, N_{ij}),$$

where g is any well behaved function that increases as $MH_j$ increases and that decreases as $N_{ij}$ increases. The value, $w_{ij}$, representing the weight given to each resource of a group $MG_j$ during an ith iteration, is referred to herein as a "group weight value".

The sum of weight values that correspond to a given machine, Mk, for all tasks it performs is expressed as:

$$WS_{ik} = \sum_{k \in MG_j} w_{ij}.$$

The value, $WS_{ik}$, representing the sum of weights for a given machine during an ith iteration is referred to herein as a "resource weight value".

The fractional allocation of a machine, Mk, to a machine group, MGj, at the ith iteration of the algorithm, is expressed as:

$$A(i,k,j) = w_{ij}/WS_{ik}$$

for all machines that are members of $MG_j$=0 otherwise.

The sum of allocations for all machines belonging to machine group $MG_j$ is expressed as:

$$N_{i+1,j} = \sum_{k \in MG_j} A(i, k, j).$$

At the final iteration, $N_j$ represents the effective number of resources in the group. If the machine group $MG_j$ has at least one shared machine, $N_j$ is a fractional value. A machine group may have only one resource which may be a shared resource, in which case $N_j$ is the same as that resource's allocation value and is a value less than one. Typically, however, a machine group will have one or more shared resources and one or more non-shared resources, in which case $N_j$ is the sum of the allocation values of the shared resources plus an integer value representing the non-shared resources.

The above algorithm acts as a linear distributor of fixed resources. The distribution of each machine's time to different machine groups is made relative to the weight values represented by $w_{ij}$'s that correspond to those machine groups containing the machine as a member. The weights used by each iteration, the $w_{ij}$'s, depend on the summed distribution of resources to the machine groups as calculated in a previous iteration.

Given a certain arrival rate, processing time, and machine group configuration, convergence of the algorithm to a desired $N_j$ depends largely on the choice of function for the weight values. As explained below, the algorithm may be solved with any one of a number of weight functions. Also, it may be solved more than once with different weighing functions to obtain intermediate solutions, which are then interpolated for a final solution.

A weighing function that is a simple ratio of $MH_j$ and $N_{ij}$ may be expressed as:

$$g(MH_j, N_{ij}) = p_{ij} = \frac{MH_j}{N_{ij}}.$$

Letting $N_{2j}$ and $N_{3j}$ be the solutions of the second and third iterations of the above algorithm, the general solution is:

$$N_j = (N_{2j} + N_{3j})/2,$$

where the midpoint between the last two iterations is used to provide a solution closer to the convergence point.

A second weighing function may be expressed as:

$$W_{ij} = \frac{p_{ij}^2}{(1-p_{ij})}.$$

Again, letting $N_{2j}$ and $N_{3j}$ be the solutions of the second and third iterations of the algorithm, the general solution is:

$$N'_j = \frac{(N_{2j} + N_{3j})}{2}$$

As compared to a solution using only one of the above weighing functions, an interpolation of two different weighing functions has been found to provide accurate results. Using $w_{ij}=p_{ij}$, the solution is:

$$N_j = \frac{N'_{2j} + N'_{3j}}{2} = \sum_{k \in MG_j} A'(k,j),$$

where $$A'(k_{ij}) = \frac{|A'(2,k,j) + A'(3,k,j)|}{2}.$$

Using $$w_{ij} = \frac{p_{ij}^2}{(1-p_{ij})},$$

the solution is:

$$N''_j = \frac{(N''_{2j} + N''_{3j})}{2} = \sum_{k \in MG_j} A''(k,j),$$

where $$A''(k,j) = \frac{|A''(2,k,j) + A''(3,k,j)|}{2}.$$

The above solutions are based on three iterations; any number of iterations may be used to obtain a final solution $N_j$. If more iterations are used, the last two iterations may be used to determine an average value.

Another version of the algorithm uses an average utilization of machine groups to adjust values of $N_j$ during each iteration. An average utilization of machine groups $MG_j$'s of which machine Mk is a member, is estimated as follows:

$$p_{av,k} = \frac{\sum_{k \in MG_j} p_j}{\sum_{k \in MG_j} 1},$$

where $P_j = MH_j/N''_j$. The above equation can be informally expressed as:

$$p_{av,k} = \frac{\sum_{k \in MG_j} p_j}{\text{number of machine groups}}.$$

The adjustment factor is then calculated as:

$$\alpha = (p_{av,k})^{1/2}$$

and the improved algorithm is:

$$N_j = \sum_{k \in MG_j} A(k,j),$$

where $A(kj) = (\alpha)A'(kj) + (1-\alpha)A''(kj)$.

The accuracy of the above algorithm may be still further improved by adding a correction term, o, such that:

$$A(k,j) = (\alpha)A'(k,j) + (1-\alpha)A''(k,j) + o(k,j).$$

The correction term, o, provides a means for adjusting the algorithm according to a scheduling strategy. For random and unbiased priority among machines, o is determined as follows:

$$o(k,j) = (p_j'' - p_{av,k})(0.85 - p_{av,k}).$$

For a strategy that gives preference to unshared machines, o is determined as:

$$o(k,j) = (p_j'' - p_{av,k})(1.85 - 2p_{av,k}),$$

which keeps shared machines available for other tasks.

A simplified example of calculation steps for the above algorithm may be followed with respect to FIGS. 1–3. In this example, the weight function is $p_{ij}$ only; the interpolated solution using two weight functions, $p_{ij}$ and $$\frac{p_{ij}^2}{1-p_{ij}},$$

is not used. For purposes of example, the following data are assumed:

10 minutes=service time per item of product A ($T_A$)
20 minutes=service time per item of product B ($T_B$)
6 lots/hour=arrival rate for product A ($AR_A$)
1.5 lots/hour=arrival rate for product B ($AR_B$).

If total machine hours, MH, for a product is defined as:

$$MH_j = ST_j \times AR_j,$$

then 1.0 machine hours are used for MG 1
0.5 machine hours are used for MG 2.

If the fraction of time each machine is available for production is assumed to be 1.0, the usage factor for each machine group is:

$$U_j = \frac{MH_j}{N_j},$$

where $N_j$ is the number of effective machines in the machine group $MG_j$.

The initial setting of $N_j$ for solving this example represents the shared machine, M2, in full in each machine group. Thus, $N_1=2$ and $N_2=2$ for the first iteration.

Using the machine usage values set out above, during the first iteration, the group weight values are:

$$p_A = \frac{1.0}{2} = 0.5$$

$$p_B = \frac{0.5}{2} = 0.25,$$

and the resource weight values are:

$WS_1 = 0.50$ $WS_2 = 0.50 + 0.25 = 0.75$ $WS_3 = 0.25.$

For this first iteration, the weight values and the allocation values are summarized in the following table:

| machine | Machine Group | w | WS | allocations w/WS |
|---|---|---|---|---|
| 1 | A | 0.50 | 0.50 | 1.000 |
| 2 | A | 0.50 | 0.75 | 0.6667 |
| 3 | B | 0.25 | 0.75 | 0.3333 |
| 4 | B | 0.25 | 0.25 | 1.0000 |

It follows from the above calculations that $\Sigma A(i,k,j) = N_A = 1 + 0.6667 = 1.6667$ $\Sigma B(i,k,j) = N_B = 1 + 0.3333 = 1.3333.$ During the second iteration of the algorithm, using the values from the first iteration as set out above, the group weight values are:

$$p_A = \frac{1.0}{1.6667} = 0.59999$$

$$p_B = \frac{0.5}{1.3333} = 0.37501.$$

The resource weight values and allocation values are calculated, with the following table summarizing the results:

| machine | Mach. Group | w | WS | w/WS |
|---|---|---|---|---|
| 1 | A | .59999 | .39999 | 1.00000 |
| 2 | A | .59999 | .97500 | 0.61537 |
| 3 | B | .37501 | .97500 | 0.38463 |
| 4 | B | .37501 | .37501 | 1.00000 |

It follows from the above calculations that $\Sigma A(i,k,j) = N_A = 1 + 0.61537 = 1.61537$ $\Sigma A(i,k,j) = N_A = 1 + 0.38463 = 1.38463.$ For the final result, the midpoint between the last two iterations provides a solution close to the convergence point. Thus, $$N_A = \frac{(1.66667 + 1.61537)}{2} = 1.64102$$

$$N_B = \frac{(1.33333 + 1.38463)}{2} = 1.35898.$$

Using these values for $N_A$ and $N_B$, a usage factor for each machine group can be calculated. This usage factor can then be compared to desired usage factors. A decision can then be made regarding how tasks should be allocated or whether resource groups should be reconfigured.

Figure 4:
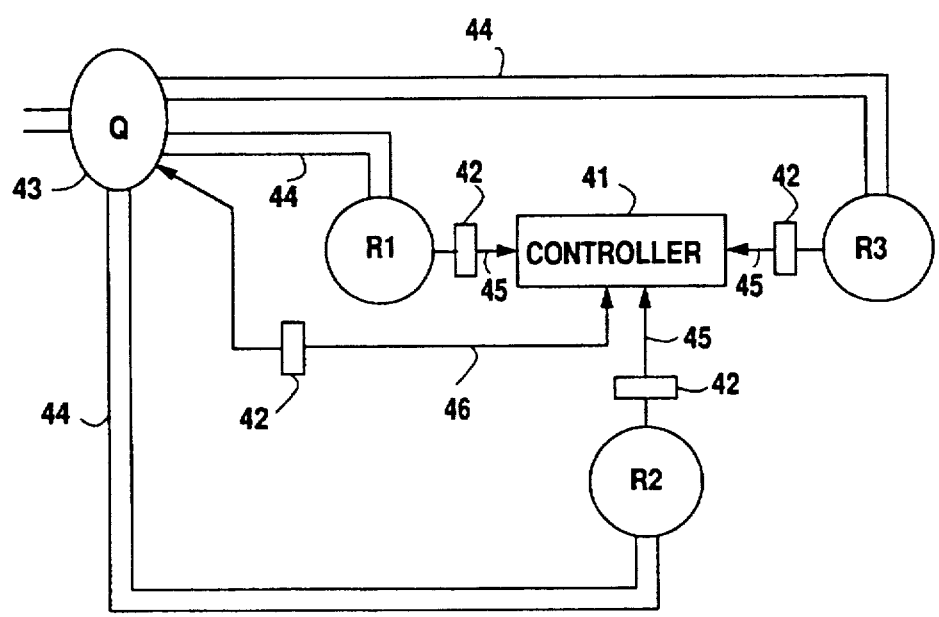
FIG. 4 illustrates a control system having a controller programmed in accordance with the invention.

FIG. 4 illustrates a control system for allocating tasks in a multi-task multi-resource environment. The resources, R1–R3, like the machines M1–M3 in the description above, include at least one shared resource. A controller 41 is programmed to calculate usage values for each machine. These values are based on data gathered by a counter/timer unit 42 associated with each machine for measuring values such as service times and arrival rates. Controller 41 receives this data via communication links 45 and calculates actual usages over a time period, t, resulting in a value, A. Over this same time period, t, running averages of arrivals and service times are received by controller 41 from task queue 43 via bidirectional communications link 46. These data are used to calculate expected usages, resulting in a value B, in accordance with the above-described method. Current data about arrivals of tasks and their required service times are also received by controller 41 via link 46 from task queue 43 to predict the upcoming expected usages, resulting in a value C, in accordance with the above-described method.

The results of the above calculations, A, B, and C, are used to predict the usage factors for the current task dispatching policy. One such method may be to set a usage factor, UF, as:

$$UF = \frac{A}{B} \times C.$$

The usage factor, which assumes no change in the task dispatching policy, is compared with a desired usage factor to determine the needed increases or decreases in flow of tasks to various resources. This modified dispatch policy is implemented by regulating the flow of tasks from task queue 43 using link 46. In this manner, as the intensity and mix of incoming tasks shift, controller 41 adjusts the flow of tasks that are delivered from task queue 43 to each resource via task flow lines 44, to achieve a desired effect.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method for controlling usage of machines in a multi-task, multi-machine environment, comprising the steps of:

a) providing a counter/timer unit for determining arrival rates and process times for each machine;

b) providing and coupling a task queue to said machines and said counter/timer unit; said task queue receiving a flow of tasks;

c) providing and coupling a programmable controller to said task queue;

d) identifying at said controller at least two machine groups, wherein the members of each machine group are those machines capable of performing a certain task, and wherein at least one member of one of said machine groups is a shared machine capable of performing more than one task;

e) with respect to each machine group, generating in said controller a signal representing a group weight value that equals the total machine usage of that group based on arrival rates and process times from said counter/timer unit divided by the number of machines in that group;

f) with respect to each machine, generating in said controller a signal representing machine weight value that equals the sum of machine usage for all tasks for that machine;

g) with respect to each machine, generating in said controller an allocation value signal for each machine representing dividing said group weight value by said machine weight value;

h) with respect to each machine group, summing in said controller allocation value signals for each machine in said group and generating a signal representing a value approximating an effective number of machines in each machine group;

i) repeating said steps e thru h in said controller using the signal representing a value approximating an effective number of machines generated in step h instead of using the number of machines in each group to generate a signal representing said group weight value until a signal representing a final effective machine value approximating the effective number of machines for each group is generated; and j) controlling flow of tasks at said task queue to said machines dynamically in response to said signal representing said final effective machine value for each group.

2. The method of claim 1 wherein said signal representing said group weight value is generated by said controller by taking the product of the process time per task times the arrival rate of said tasks and dividing that by the number of machines in the group.

3. The method of claim 1 wherein said signal representing said final effective machine value is generated by said controller by calculating the final effective machine value of the two proceeding iterations.

4. The method of claim 1 wherein in generating said signal representing said group weight value said group weight value is squared and divided by the difference between one and said group weight value, and the resulting value is used in subsequent steps instead of said group weight value.

5. The method of claim 1, and further comprising the step of using said final effective machine value to calculate a group usage value.

6. The method of claim 1, wherein said step of controlling flow of tasks includes reconfiguring machines within said machine groups.

7. The method of claim 1, and further comprising the step of using more than one group weighing function and interpolating the results at each iteration to provide said signal representing said final effective machine value.

8. The method of claim 7, wherein said interpolation is accomplished by averaging the results at each iteration.

9. The method of claim 7, wherein said interpolation is accomplished by calculating an adjustment factor that equals the square root of an average machine utilization, multiplying one result by said adjustment factor, multiplying another result by the difference between one and said adjustment factor, and summing the products.

10. The method of claim 9, and further comprising the step of adding a correction value.

11. A method for controlling usage of machines in a multi-task, multi-machine environment, comprising the steps of:

a) providing a counter/timer unit for determining arrival rates and process times for each machine;

b) providing and coupling a task queue to said machines and said counter/timer unit; said task queue receiving a flow of tasks;

c) providing and coupling a programmable controller to said task queue;

d) identifying at said controller at least two machine groups, wherein the members of each machine group are those machines capable of performing a certain task, and wherein at least one member of said machine group is a shared machine capable of performing more than one task;

e) with respect to each machine group, generating in said controller a signal representing a group weight value that equals the total machine usage of that group based on arrival rates and process times from said counter/timer unit divided by the number of machines in that group, f) with respect to each machine, calculating in said controller a machine weight value that equals the sum of machine usage for all tasks for that machine and generating a signal representing a first allocation value that is equal to said group weight value divided by said machine weight value;

g) with respect to each machine group, generating in said controller a normalized group weight value representing first group weight value squared divided by the difference between one and said group weight value;

h) with respect to each machine, generating in said controller a signal representing a second allocation value that equals said normalized group weight value divided by said equipment weight value;

i) with respect to each machine group, generating a signal representing a final effective machine value in said controller by summing said first allocation value and said second allocation value to obtain two iteration values approximating an effective number of machines in each group and by interpolating in said controller said two iteration values;

j) repeating said steps h and i in said controller using the results of said interpolation instead of using the number of machines in each group to determine said group weight value, until a signal is generated representing a final effective machine value approximating the effective number of machines for each group is obtained; and k) controlling flow of tasks at said task queue to said machines dynamically in response to said signal representing said final effective machine value for each group.

12. The method of claim 11, wherein said interpolation is accomplished by finding an average of said two iteration values.

13. The method of claim 11, and further comprising the step of calculating an average utilization factor of each machine group, and where said interpolation is accomplished by multiplying said average utilization factor times said first iteration value, multiplying said average utilization factor times said second iteration value, summing the products, and adding a correction value.

14. The method of claim 13, wherein said correction value depends on a scheduling strategy.

15. The method of claim 13, wherein said correction value is the product of said group weight value minus said average utilization factor times a predetermined number minus said average utilization factor.

16. A multi-machine apparatus with means for controlling the allocation of machine in a multi-task, multi-machine environment comprising:

a plurality of machines;

said machines comprising at least two machine groups wherein the members of each machine group are those machines capable of performing a certain task, and wherein at least one of those machines in a machine group is a shared machine capable of performing more than one of the tasks;

a task queue coupled to said plurality of machines and adapted to receive a plurality of tasks;

a counter/timer unit coupled to said task queue and responsive to said multi-tasks for determining the process time per lot of said multi-tasks and the arrival rate of lots of said multi-tasks for said machine group;

a programmable controller coupled using communication links to sad task queue for generating a control signal representing a final effective machine value;

said control signal generated by said controller programmed to perform the following steps:

a) with respect to each machine group, generating in said controller a signal representing a group weight value that equals the total machine usage of that group based on arrival rates and process times from said counter/timer unit divided by the number of machines in that group;

b) with respect to each machine, generating in said controller a signal representing machine weight value that equals the sum of machine usage for all tasks for that machine;

c) with respect to each machine, generating in said controller an allocation value signal for each machine weight value;

d) with respect to each machine group, summing in said controller allocation values for each machine in said group and generating a signal representing a value approximating an effective number of machines in each equipment group; and e) repeating said steps a thru d in said controller using the signal representing an effective number of machines generated in step d instead of using the number of machines in each group to generate a signal representing said group weight value until said control signal representing a final effective machine value approximating the effective number of machines for each group is generated; and a communications link for coupling said control signal to said task queue to control the flow of tasks to said machines dynamically in response to said control signal from said controller.

* * * * *